US008591371B2

(12) United States Patent
Dinter et al.

(10) Patent No.: US 8,591,371 B2

(45) Date of Patent: Nov. 26, 2013

(54) PLANETARY GEAR MECHANISM FOR A WIND POWER PLANT

(75) Inventors: Ralf Martin Dinter, Gelsenkirchen (DE); Arno Klein-Hitpass, Aachen (DE); Thomas Meyer, Stolberg (DE)

(73) Assignee: Siemens Aktiengesellschaft, München (DE)

(*) Notice: Subject to any disclaimer, the term of this patent is extended or adjusted under 35 U.S.C. 154(b) by 290 days.

(21) Appl. No.: 13/097,667

(22) Filed: Apr. 29, 2011

(65) Prior Publication Data

US 2012/0108380 A1 May 3, 2012

(30) Foreign Application Priority Data

Apr. 30, 2010 (EP) .................................... 10004567

(51) Int. Cl.
*F16H 57/04* (2010.01)

(52) U.S. Cl.
USPC .......................................................... 475/160

(58) Field of Classification Search
USPC .......... 475/159, 160, 331, 348; 384/107, 121, 384/420, 425, 114, 129, 160, 276, 280, 286, 384/293, 100
See application file for complete search history.

(56) References Cited

U.S. PATENT DOCUMENTS

| | | | | |
|---|---|---|---|---|
| 3,539,035 | A * | 11/1970 | Wolkenstein | 184/6.12 |
| 4,756,212 | A * | 7/1988 | Fuehrer | 475/159 |
| 5,911,513 | A * | 6/1999 | Tsuji et al. | 384/276 |
| 6,991,377 | B2 * | 1/2006 | Yamamoto et al. | 384/291 |
| 7,862,240 | B2 * | 1/2011 | Guerreiro et al. | 384/276 |
| 8,360,647 | B2 * | 1/2013 | Andler | 384/276 |

FOREIGN PATENT DOCUMENTS

| | | | |
|---|---|---|---|
| CN | 101581284 | A | 11/2009 |
| DE | 4441258 | A1 | 6/1996 |
| DE | 102008010307 | A1 | 6/2009 |
| EP | 1403558 | A2 | 3/2004 |
| EP | 1431575 | A2 | 6/2004 |
| GB | 1550789 | A | 8/1979 |
| JP | 2006170413 | A1 | 6/2006 |
| WO | WO 2009141140 | A2 | 11/2009 |

* cited by examiner

*Primary Examiner* — Justin Holmes

(74) *Attorney, Agent, or Firm* — Henry M. Feiereisen LLC

(57) ABSTRACT

A planetary gear mechanism for a wind power plant includes a sun gear, an internal gear and a planetary carrier with planetary gears supported by radial and axial slide bearings. The radial slide bearings include a sleeve made of a slide bearing material and attached as an inner ring to a planetary gear shaft or mounted as an outer ring in a bore in a planetary gear. An outer bearing ring cooperating with the inner ring is formed by the bore in the planetary gear, or an inner bearing ring cooperating with the outer ring is formed by the planetary gear shaft. A slide bearing material of a first bearing element of the axial slide bearings is applied between a planetary carrier cheek and an end side of a planetary gear. The end side of the planetary gear or the planetary carrier cheek forms a corresponding cooperating second bearing element.

24 Claims, 5 Drawing Sheets

102 117 111 111 117 114 103 101 110 110 115 112 113 116 109 104 108 107 106 105 105 106 5

1
2
3
4
4
5
5
6
6
7
8
9

PLANETARY GEAR MECHANISM FOR A WIND POWER PLANT

CROSS-REFERENCES TO RELATED APPLICATIONS

This application claims the priority of European Patent Application, EP10004567, filed Apr. 30, 2010, pursuant to 35 U.S.C. 119(a)-(d), the content of which is incorporated herein by reference in its entirety as if fully set forth herein.

BACKGROUND OF THE INVENTION

The present invention relates to a planetary gear mechanism for a wind power plant.

The following discussion of related art is provided to assist the reader in understanding the advantages of the invention, and is not to be construed as an admission that this related art is prior art to this invention.

Gear mechanisms for wind power plants were until now predominantly constructed with roller bearings. Slide bearings have previously been used only very rarely. The reasons for this are frequently occurring transient operating conditions and temporarily extremely low sliding speeds with simultaneous extreme stressing of the slide bearings. Conventional slide bearings are used in particular under conditions of use with high to very high rotational speeds. As a result, usually roller bearings are used virtually exclusively for bearing points in wind power gear mechanisms.

Conventional slide bearing materials are, for example, white metals with alloy components and bronze alloys. In general, slide bearings in industrial applications are configured with a lubrication gap of approximately 15-20 μm at the operating point. Approximately 5 MPa for white metal is specified as the permissible average dynamic pressure by bearing manufacturers.

It would therefore be desirable and advantageous to obviate prior art shortcomings and to provide an improved planetary gear mechanism for a wind power plant with planetary gear bearings that can be manufactured cost-effectively and have a very long service life.

SUMMARY OF THE INVENTION

According to one aspect of the present invention, a planetary gear mechanism for a wind power plant includes, in addition to at least one sun gear, an internal gear and a planetary carrier in which a plurality of planetary gears are mounted, a plurality of radial slide bearings for supporting the planetary gears. The radial slide bearings each include a sleeve which is made of a slide bearing material, and is either attached as an inner ring to a planetary gear shaft or is mounted as an outer ring in a bore in a planetary gear. An associated outer bearing ring or inner bearing ring is formed either by the bore in the planetary gear or by the planetary gear shaft. Furthermore, a plurality of axial slide bearings are provided for supporting the planetary gears which each include a first bearing element made of a slide bearing material. The slide bearing material is applied to a contact face between a planetary carrier cheek and an end side of a planetary gear, either onto the planetary carrier cheek or onto the end side of the planetary gear. An associated second bearing element is formed either by the end side of the planetary gear or by the planetary carrier cheek. In this way, both axial slide bearings and radial slide bearings for planetary gears of a wind power plant gear mechanism can be manufactured cost-effectively and provide a virtually unlimited service life given adequate lubrication.

In order to perform pressure lubrication of the axial slide bearings and radial slide bearings, an oil distributor ring is preferably provided which surrounds a sun gear shaft radially and has a connection to an oil supply duct in a transmission housing. At least one oil distribution duct, which is connected to the oil distributor ring and ends at a lubrication point for a planetary gear bearing, is formed in the planetary carrier. Furthermore, in order to perform splash lubrication of the axial slide bearings and radial slide bearings, in each case a bore can be provided in the planetary gear shafts, which bore forms an oil reservoir which can be filled when the respective planetary gear shaft dips into an oil sump.

According to one preferred embodiment of the present invention, in each case two bores, which start from the oil reservoir, extend radially and end at the sleeve, are provided in the planetary gear shafts. Furthermore, the sleeves have, in regions in which the bores starting from the oil reservoir end, in each case two lubricant collecting devices which are each formed, for example, by recesses on the sleeve. The sleeves each have a circumferential lubricant supply groove between the two lubricant collecting devices. In this way, particularly effective lubrication of the radial slide bearings can be implemented.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
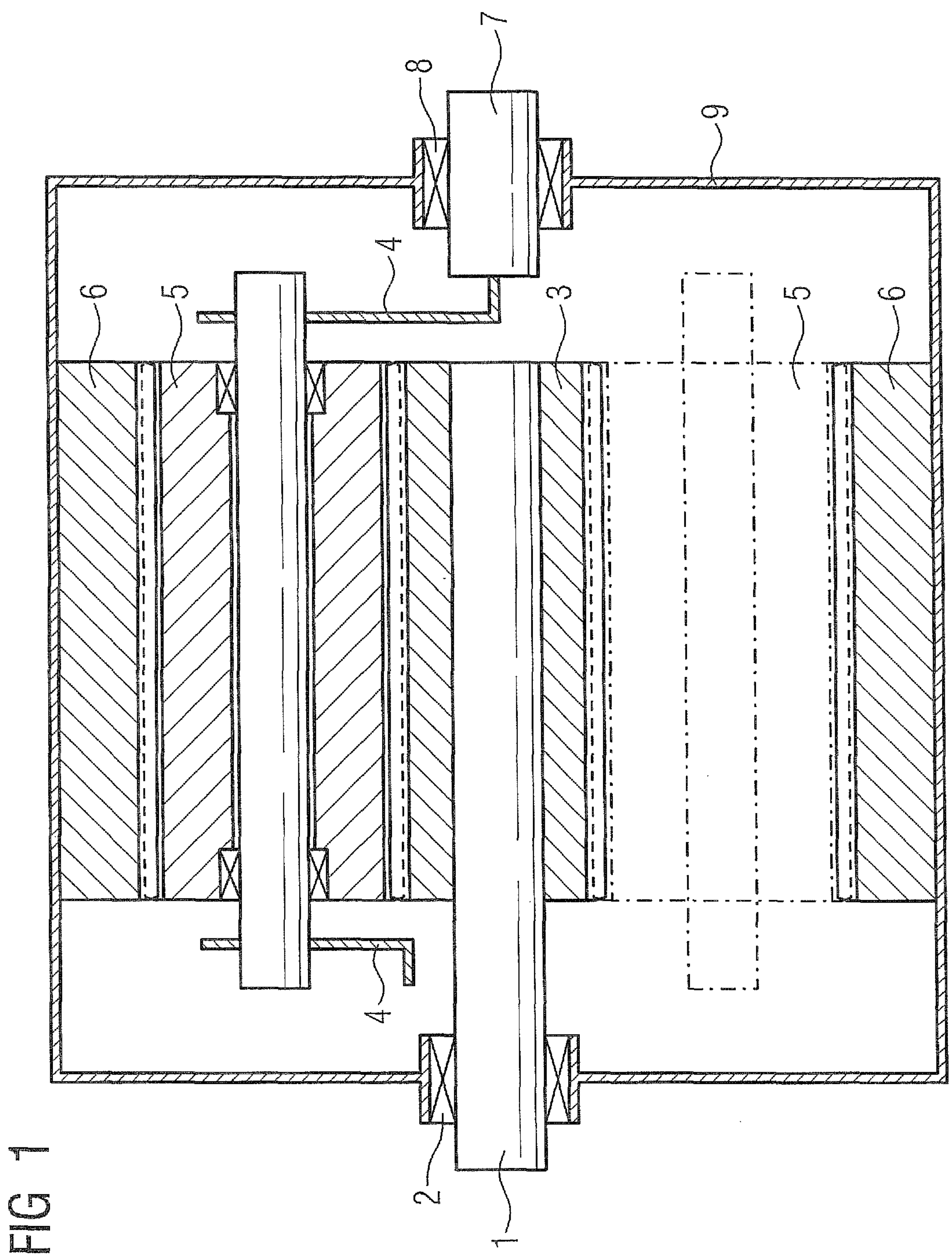
FIG. 1 shows a schematic diagram of a planetary gear mechanism.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a planetary gear mechanism with at least one sun gear 3 connected to a first transmission shaft 1, an internal gear 6 and a planetary carrier 4 in which a plurality of planetary gears 5 are mounted, and which is connected to a second transmission shaft 7. The internal gear 6 can be integrated into a single-component or a multi-component transmission housing 9, which also has bearing seats for bearings 2, 8 of the first and second transmission shafts 1, 7. The bearing seats may be integrated, for example, into housing lids.

Figure 2:
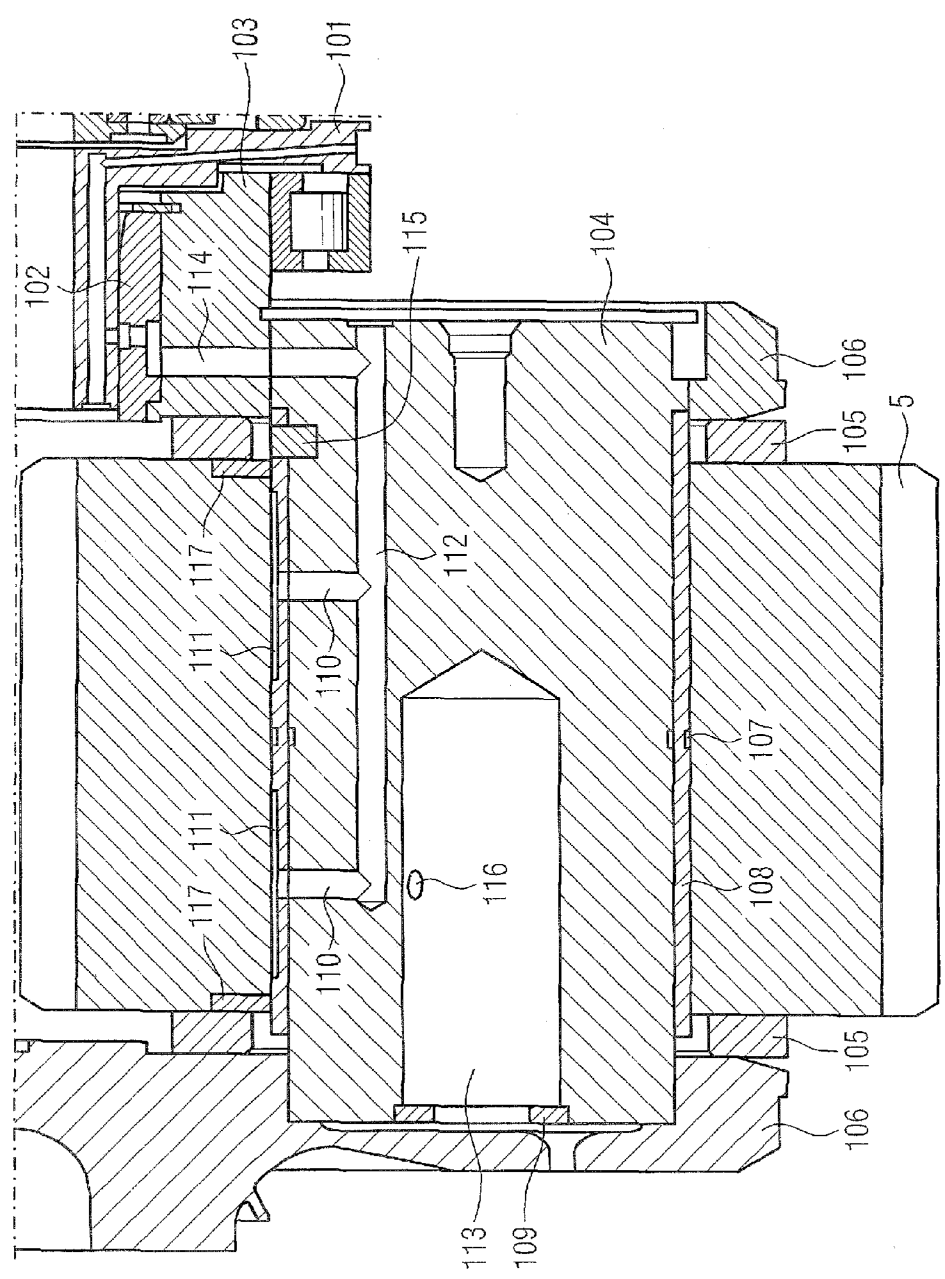
FIG. 2 shows a longitudinal section through a planetary carrier with a planetary gear according to a first embodiment variant.

FIG. 2 illustrates a planetary carrier 4 with a planetary gear 5 for a planetary gear mechanism according to FIG. 1 in longitudinal section. A plurality of radial slide bearings, which each include a sleeve 108 made of a slide bearing material, are provided for supporting the planetary gears 5. According to a first embodiment variant, the sleeve 108 is attached as an inner ring to a planetary gear shaft 104. An associated outer bearing ring is formed by a bore in the planetary gear 5 made from a material suitable for teeth.

The sleeve 108 can be connected in a frictionally locking, positively locking or materially joined fashion to the planetary gear shaft 104. If the sleeve 108 is connected in a materially joined fashion to the planetary gear shaft 104, it is preferably formed by coating the planetary gear shaft 104 with a slide bearing material. In the case of a frictionally locking connection, the sleeve 108 can be additionally secured by means of one or more securing pins 115.

The planetary gear shaft 104 is secured in a frictionally locking or positively locking fashion by means of planetary carrier cheeks 106 and is secured against rotation by means of any desired securing element (not explicitly illustrated). The planetary gear 5 is guided axially by means of two axial slide bearings 105. The two axial slide bearings 105 are optionally connected in a frictionally locking fashion or positively locking fashion to the planetary carrier cheeks 106. Mating running faces are correspondingly formed by insides of the planetary gear 5. The axial slide bearings for supporting the planetary gears 5 therefore each include a first bearing element made of a slide bearing material which can be applied to a contact face between a planetary carrier cheek 106 and an end side of a planetary gear 5, either onto the planetary carrier cheek 106 or to the end side of the planetary gear 5. Accordingly, an associated second bearing element is formed either by the end side of the planetary gear 5 or by the planetary carrier cheek 106.

Figure 3:
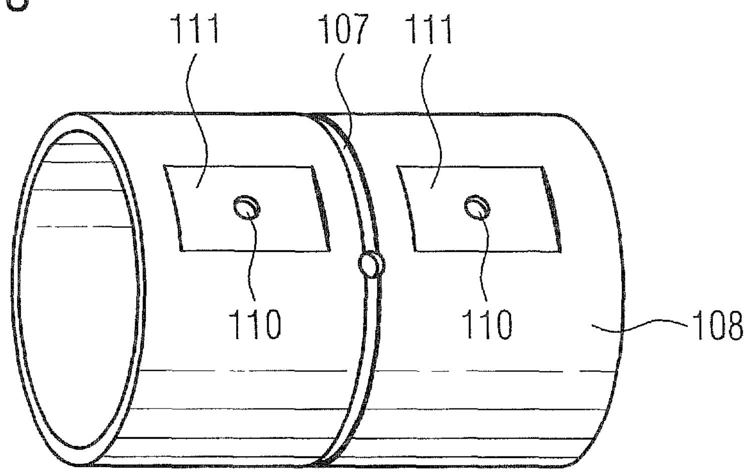
FIG. 3 shows a sleeve for a radial slide bearing of a planetary gear according to FIG. 2.

In order to perform pressure lubrication of the axial slide bearings and radial slide bearings, an oil distributor ring 102, which radially surrounds a sun gear shaft, is provided. The oil distributor ring 102 has a connection to an oil supply duct in a transmission housing or to a spatially fixed stator 101, which is attached to the transmission housing. In the present exemplary embodiment, the oil distributor ring 102 is arranged radially between the stator 101 and an annular projection 103 on the planetary carrier 4. Furthermore, a plurality of oil distribution duct sections 110, 112, 114, which have on the one hand a connection to the oil distributor ring 102 and on the other hand a connection to lubrication points for planetary gear bearings, are provided in the planetary carrier 4. A first oil distribution duct section 114 runs in a planetary carrier cheek 106 and is continuous with a second oil distribution duct section 112, which runs parallel to the planetary gear shaft 104. Two further oil distribution duct sections 110 extend between the second oil distribution duct section 112 and the sleeve 108. The two further oil distribution duct sections 110 penetrate the planetary gear shaft 104 and the sleeve 108 here. This is also apparent from the perspective illustration of the sleeve 108 in FIG. 3. The sleeve 108 has a lubricant collecting device 111 in each of at least two regions in which the further oil distribution duct sections 110 end. The lubricant collecting devices 111 are formed by recesses on the sleeve 108. The sleeve 108 has a circumferential lubricant supply groove 107 between the two lubricant collecting devices 111.

Figure 4:
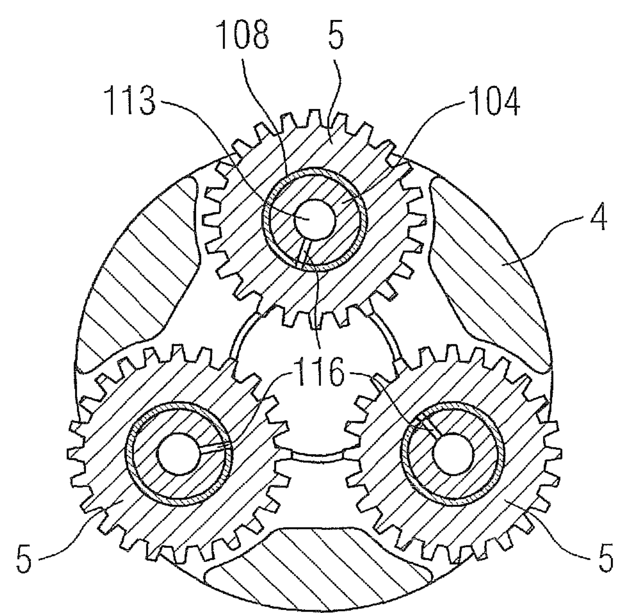
FIG. 4 shows a cross section through the planetary carrier according to FIG. 2.
Figure 5:
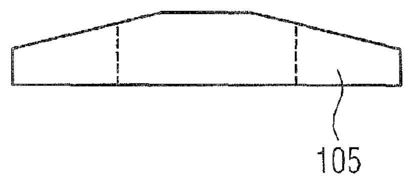
FIG. 5 shows a bearing element for an axial slide bearing of the planetary gear according to FIG. 2 in profile.
Figure 7:
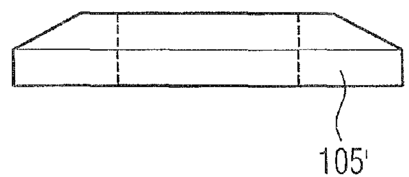
FIG. 7 shows an alternative bearing element for an axial slide bearing of the planetary gear according to FIG. 2 in profile.
Figure 6:
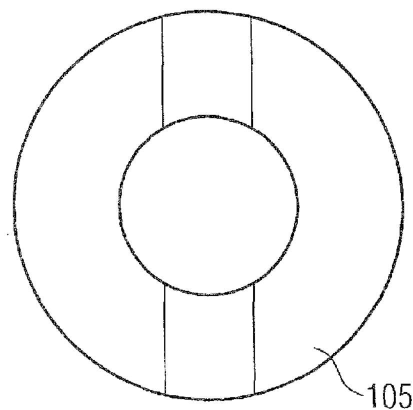
FIG. 6 shows the bearing element according to FIG. 5 in a plan view.
Figure 8:
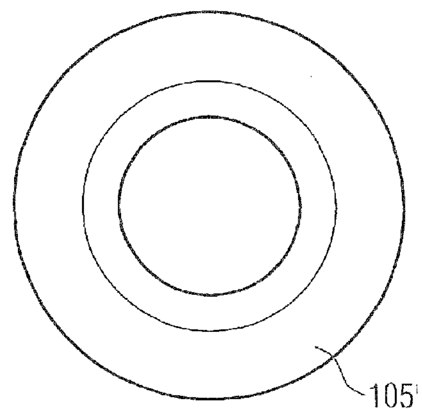
FIG. 8 shows the bearing element according to FIG. 7 in a plan view.

In order to ensure a sufficient lubricating film in the respective radial slide bearing, collecting edges 117 are provided at the end sides of the planetary gear 5. The collecting edges 117 can be integrally formed onto the planetary gear 5 in the region of the bores or onto the planetary gear shafts 104 in the circumferential direction.

in order to perform splash lubrication of the axial slide bearings and radial slide bearings, a bore 113 is provided in the planetary gear shaft 104, which bore 113 forms an oil reservoir which can be filled by dipping the planetary gear shaft 104 into an oil sump. As is also apparent from FIG. 4, the planetary gear shaft 104 has at least one bore 116 which starts from the oil reservoir, extends radially and ends at the sleeve 108. In this region, a lubricant collecting pocket is also provided on the sleeve 108, which lubricant collecting pocket corresponds to the lubricant collecting devices 111 illustrated in FIG. 3 and is formed by a recess on the sleeve 108. A collecting edge 109 or a baffle plate is provided on the planetary carrier 4 or in the planetary gear shaft 104 in order to ensure that oil used for splash lubrication is held in the oil reservoir after the planetary gear shaft 104 has exited an oil sump. The diameter of the bore 113 for the oil reservoir is reduced in certain sections by the collecting edge 109.

Overall, the lubrication of the slide bearings can be carried out in the 3 ways specified below.

1. Pressure lubrication for the loaded operation of the gear mechanism. The slide bearings are supplied by means of pressurized oil from the planetary gear shaft 104. In this context, the supply of pressurized oil occurs approximately 90° before the maximum of the loading zone of the bearing.
2. Splash lubrication for the load-free operation of the gear mechanism. The slide bearings are supplied with oil by means of an oil reservoir in the planetary gear shaft 104. The oil reservoir is filled with oil by the dipping of the planetary gear shaft 104 into the oil sump, and it passes this oil on to the slide bearing. The supply of oil occurs approximately 110° before the maximum of the loading zone of the bearing. The hydraulic connection of the pressure lubrication and the splash lubrication ensures that the oil runs away.
3. Oil storage for the load-free operation of the gear mechanism. The radial slide bearings are equipped with oil collecting edges on the end sides of the planetary gears 5, with the result that there is always a defined oil spacing in the radial slide bearing. This ensures lubrication of the radial slide bearings in the load-free state.

According to FIGS. 5 to 8, the axial slide bearings 105, 105' which are respectively illustrated in profile and in a plan view can have a geometric shape which is determined by a pitched-roof-like or rotationally symmetrical correction of their profile. In this way, the axial slide bearings 105, 105' are adapted to deformations of planets, planetary shafts or planetary carriers which occur during operation of the wind power plant.

Figure 9:
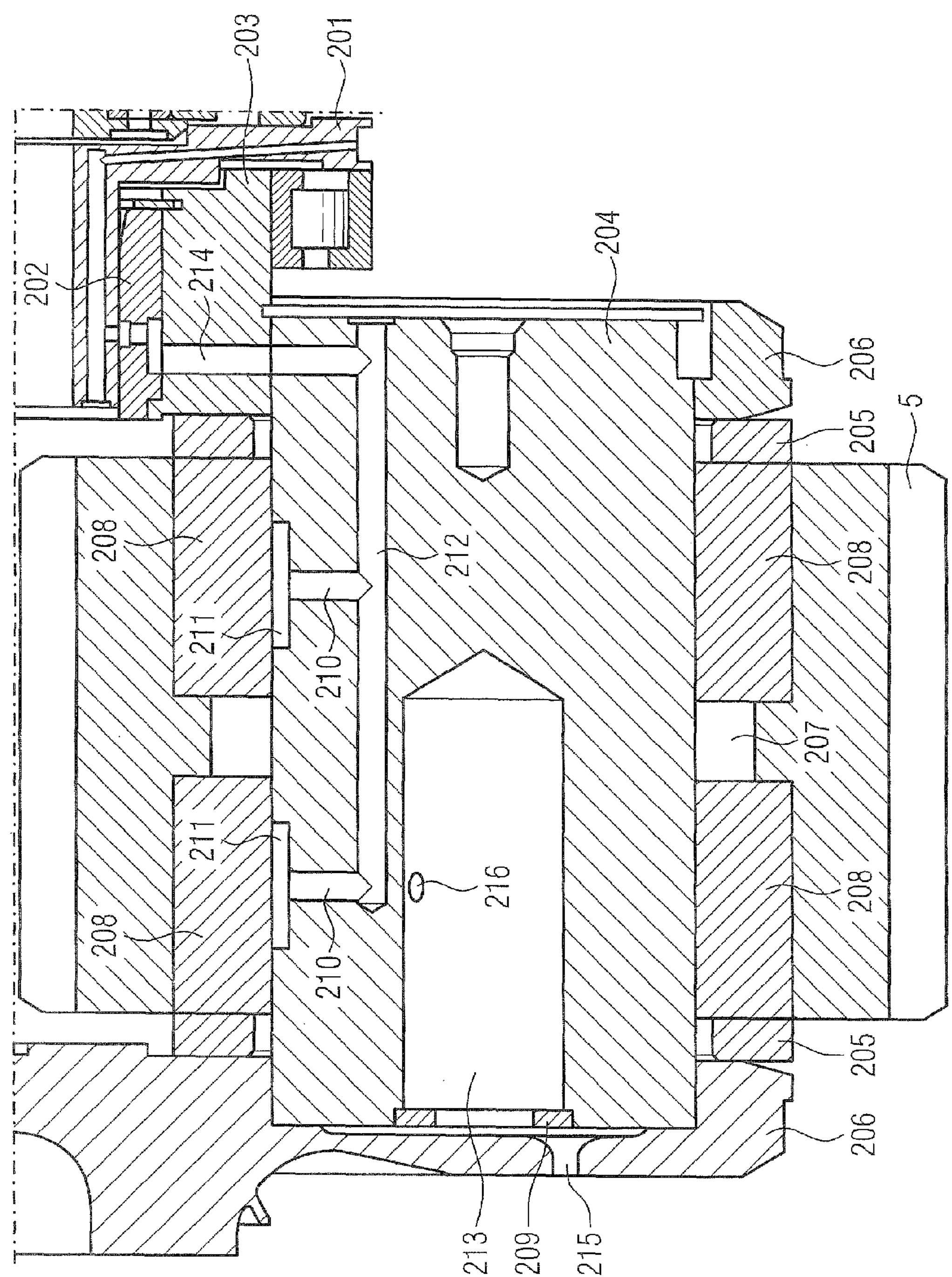
FIG. 9 shows a longitudinal section through a planetary carrier with a planetary gear corresponding to a second embodiment variant.

According to the second embodiment variant illustrated in FIG. 9, the sleeve 208 and/or a bushing is mounted as an outer ring of a radial slide bearing in a bore in a planetary gear 5. Accordingly, an associated inner bearing ring is formed by the planetary gear shaft 204. The sleeve 208 can be connected in a frictionally locking, positively locking or materially joined fashion to the planetary gear 5. If the sleeve 208 is connected in a materially joined fashion to the planetary gear 5, it is preferably formed by coating the planetary gear 5 with a slide bearing material. Furthermore, the sleeve 208 can be embodied as a single component or as multiple components.

The sleeve 208 has end faces which are oriented with respect to the planetary carrier cheeks 206 and which serve as first bearing elements of an axial slide bearing. The two end faces each run against guide disks 205, which are connected as second bearing elements to the planetary carrier cheeks 206 in a frictionally locking or positively locking fashion. The second bearing elements can basically also be formed by the two planetary carrier cheeks 206 themselves. The planetary gear shaft 204 is secured in a frictionally locking or positively locking fashion by planetary carrier cheeks 206 and is secured against rotation by means of any desired securing element (not explicitly illustrated).

As in the first embodiment variant, an oil distributor ring 202 is provided for performing pressure lubrication of the axial slide bearings and radial slide bearings. The oil distributor ring 202 has a connection to a spatially fixed stator 201 and is arranged radially between the stator 102 and an annular projection 203 on the planetary carrier 4. Furthermore, a plurality of oil distribution duct sections 210, 212, 214, which have on the one hand a connection to the oil distributor ring 202 and on the other hand a connection to lubrication points for planetary gear bearings, are provided in the planetary carrier 4.

The sleeve 208 has a lubricant collecting device 211 in each of at least two regions in which the oil distribution duct sections 210 end. The lubricant collecting devices 211 are formed by recesses on the planetary gear shaft 204 or on the sleeve 208. The sleeve 208 is configured in two parts in the present exemplary embodiment and includes two sleeve sections. A circumferential lubricant supply groove 207 is formed between the two sleeve sections 211.

So that oil which is used for splash lubrication is held in an oil reservoir formed by a bore 213 in the planetary gear shaft 204 after the planetary gear shaft 204 has exited an oil sump, collecting edges 209, 215 are provided on the planetary carrier 4 and on the bore 213. As in the first embodiment variant, the planetary gear shaft 204 has at least one bore 216 which starts from the oil reservoir, extends radially and ends at the sleeve 208.

The radial slide bearings can be embodied as a single component or a multi-component circular cylinder bearing or as a lemon-type bearing. An embodiment as a single component or multi-component cam disk, single component or multi-component wedge surface bearing for one rotational direction, single component or multi-component wedge surface bearing for 2 rotational directions, tilting segment bearing for one or two rotational directions or an axial bearing with circular sliding shoes is possible for the axial slide bearings.

Lead-free alloys are preferably used as the slide bearing material for the axial slide bearings and radial slide bearings. Tooth arrangements and bearings can be lubricated with an oil which preferably has a degree of viscosity of at least 320 and according to one preferred embodiment is provided with an extra-pressure additive.

Copper-zinc alloys with a proportion of zinc between 6% and 40% can also be used as the slide bearing materials for the axial slide bearings and radial slide bearings. Al, Ni, Mn, Si and Fe can be provided as further alloy elements. Alternatively, copper-tin alloys with a proportion of tin between 4% and 12% can be used as the slide bearing material for the axial slide bearings and radial slide bearings. In this context, Ni and Zn are possible as further alloy elements. As an alternative to copper-zinc alloys or copper-tin alloys, aluminum-tin alloys with a proportion of tin between 6% and 40% can also be used as the slide bearing materials for the axial slide bearings and radial slide bearings.

The slide bearings can be implemented cost-effectively if the slide bearing material is respectively roll-bonded on a steel supporting body. In addition or as an alternative to this, the axial slide bearings and radial slide bearings can have a Physical Vapor Deposition (PVD) coating. In a top coating level, the axial slide bearings and radial slide bearings can also have a synthetic or galvanic running-in layer.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed is:

1. A planetary gear mechanism for a wind power plant, comprising:

at least one sun gear, an internal gear and a planetary carrier, a plurality of planetary gears comprising planetary gear shafts supported in the planetary carrier, a plurality of radial slide bearings supporting the planetary gears, each radial slide bearing including a sleeve made of a slide bearing material, said sleeve being either attached as an inner ring to a planetary gear shaft or being mounted as an outer ring in a bore of a planetary gear, wherein an outer bearing ring cooperating with the inner ring is formed by the bore in the planetary gear or an inner bearing ring cooperating with the outer ring is formed by the planetary gear shaft, respectively, a plurality of axial slide bearings supporting the planetary gears, each axial slide bearing including a first bearing element made of a slide bearing material, said slide bearing material being applied to a contact face disposed between a planetary carrier cheek and an end face of a planetary gear either on the planetary carrier cheek or on the end face of the planetary gear, wherein a cooperating second bearing element is formed either by the end face of the planetary gear or by the planetary carrier cheek, respectively, an oil distributor ring which radially surrounds a shaft of the sun gear and comprises a connection to an oil supply duct in a transmission housing for pressure lubrication of the axial slide bearings or the radial slide bearings, or both, and at least one oil distribution duct disposed in the planetary carrier and connected to the oil distributor ring and terminating at a lubrication point for a planetary gear bearing.

2. The planetary gear mechanism of claim 1, wherein each planetary gear shaft comprises two radially extending bores which start from an oil distribution duct section which is parallel to the planetary gear shaft, and wherein each sleeve has two lubricant collecting devices and a circumferential lubricant supply groove arranged between the two lubricant collecting devices.

3. The planetary gear mechanism of claim 1, wherein each of the planetary gear shafts comprises a first bore for splash lubrication of the axial slide bearings or radial slide bearings, or both, said first bore forming an oil reservoir constructed to be filled by dipping the respective planetary gear shaft into an oil sump.

4. The planetary gear mechanism of claim 3, wherein each of the planetary gear shafts comprises a radially extending second bore which starts from the oil reservoir and ends at the sleeve.

5. The planetary gear mechanism of claim 4, further comprising a lubricant collecting device disposed in a region the sleeve where the oil reservoir ends.

6. The planetary gear mechanism of claim 5, wherein the lubricant collecting device is formed by a recess on the sleeve.

7. The planetary gear mechanism of claim 3, wherein the planetary gear shafts comprise a collecting edge disposed on an end side of the planetary gear shaft and at least partially reducing a diameter of the first bore.

8. The planetary gear mechanism of claim 1, wherein the planetary gears comprise a collecting edge disposed on an end side of the planetary gear for providing a lubricating film in a respective radial slide bearing.

9. The planetary gear mechanism of claim 8, wherein the collecting edge is integrally formed on a planetary gear in a region of the first bore or in a circumferential direction on the planetary gear shaft.

10. The planetary gear mechanism of claim 1, wherein the sleeves are connected to a respective planetary gear shaft or a respective planetary gear by a friction lock, a positive lock or a material lock.

11. The planetary gear mechanism of claim 1, wherein the sleeves are formed from a coating of a slide bearing material, which coating is materially joined with the respective planetary gear shaft or the respective planetary gear.

12. The planetary gear mechanism of claim 11, wherein the slide bearing material for the axial slide bearings or the radial slide bearings, or both, comprises a lead-free alloy.

13. The planetary gear mechanism of claim 12, wherein at least one of a tooth arrangement of the gears, the radial slide bearings and the axial slide bearings are lubricated with an oil having a viscosity grade of at least 320.

14. The planetary gear mechanism of claim 12, wherein at least one of a tooth arrangement of the gears, the radial slide bearings and the axial slide bearings are lubricated with an oil having an extra-pressure-additive.

15. The planetary gear mechanism of claim 1, wherein at least one of axial slide bearings and the radial slide bearings is constructed of copper-zinc alloys having a zinc fraction between 6% and 40%.

16. The planetary gear mechanism of claim 15, wherein the copper-zinc alloys further comprise at least one additional alloy element selected from Al, Ni, Mn, Si and Fe.

17. The planetary gear mechanism of claim 1, wherein at least one of the axial slide bearings and the radial slide bearings is constructed of copper-tin alloys having a tin fraction between 4% and 12%.

18. The planetary gear mechanism of claim 17, wherein the copper-tin alloys further comprise at least one additional alloy element selected from Ni and Zn.

19. The planetary gear mechanism of claim 1, wherein at least one of the axial slide bearings and the radial slide bearings is constructed of aluminum-tin alloys having a tin fraction between 6% and 40%.

20. The planetary gear mechanism of claim 1, wherein the slide bearing material of the radial slide bearings or the axial slide bearings, or both, is roll-bonded onto a steel supporting body.

21. The planetary gear mechanism of claim 1, wherein the axial slide bearings or radial slide bearings, or both, have a Physical Vapor Deposition (PVD) coating.

22. The planetary gear mechanism of claim 1, wherein the axial slide bearings or the radial slide bearings, or both, have a top coating comprising a synthetic or galvanic running-in layer.

23. The planetary gear mechanism of claim 1, wherein the axial slide bearings or the radial slide bearings, or both, assume a corrected geometric shape produced by a deformation of adjoining components.

24. The planetary gear mechanism of claim 23, wherein the corrected geometric shape comprises a profile akin to a pitched-roof-structure or a rotationally symmetric structure.

* * * * *